United States Patent [19]

Bischof

[11] Patent Number: 5,593,597
[45] Date of Patent: Jan. 14, 1997

[54] FILTRATION SYSTEM COMPRISING SIEVING TROUGH, HELIX AND ADDITIONAL SIEVING APPARATUS

[75] Inventor: Rüdolf Bischof, Eching, Germany

[73] Assignee: Rudolf Bischof GmbH, Germany

[21] Appl. No.: 295,503

[22] Filed: Aug. 24, 1994

[30] Foreign Application Priority Data

Aug. 24, 1993 [DE] Germany ............... 43 28 476.0

[51] Int. Cl.⁶ ............... B01D 33/80; B01D 33/76; B01D 33/42; B01D 33/46
[52] U.S. Cl. ............... 210/744; 210/155; 210/158; 210/337; 210/396; 210/780; 210/791
[58] Field of Search ............... 210/97, 107, 154–162, 210/391, 394, 413, 415, 744, 780, 791, 408, 409, 295, 297, 314, 315, 324, 335, 337, 338, 396

[56] References Cited

U.S. PATENT DOCUMENTS

| | | | |
|---|---|---|---|
| 4,521,306 | 6/1985 | Day | 210/159 |
| 4,634,524 | 1/1987 | Huber | 210/158 |
| 4,836,919 | 6/1989 | Huber | 210/161 |
| 4,859,322 | 8/1989 | Huber | 210/162 |
| 5,110,461 | 5/1992 | Abel | 210/158 |
| 5,122,263 | 6/1992 | Huber | 210/415 |
| 5,207,904 | 5/1993 | Abel | 210/155 |

FOREIGN PATENT DOCUMENTS

| | | |
|---|---|---|
| 0565898 | 3/1993 | European Pat. Off. . |
| 3420157 | 1/1986 | Germany . |
| 4042167 | 7/1991 | Germany ............... 210/162 |
| 9212340 | 2/1993 | Germany . |
| 2107307 | 4/1990 | Japan ............... 210/162 |

OTHER PUBLICATIONS

Product Pamphlet (6 pages) –Noggerath Spiralsieb, Noggerath & Co., Ahnsen, Germany, Date Unknown.

*Primary Examiner*—Joseph W. Drodge
*Attorney, Agent, or Firm*—Alfred Stapler, Esq.; Lipton & Stapler

[57] ABSTRACT

The invention relates to an apparatus for removing solid components from a fluid in a trough (1) having a transport device (3) in the form of a transport trough (4) and a rotationally driven transport helix (6), the transport device (3) having at one end a solids outlet (9) and at the opposite end a sieving surface (15) at least in portions of the surface, in which the solid components are able to be sieved out of the fluid and are able to be transported to the solids outlet (9) via the transport helix (6) in the axial direction of the transport device (3). In order to provide apparatus which can also process larger quantities of fluid and do so during variations in supply quantities, it is proposed that the transport device (3) have a sieving apparatus (19) between the solids outlet (9) and the sieving surface (15) located at the input side in the transport direction, whose sieving surface when projected upon the transport device (3) is larger than the diameter of the transport trough (4), the sieving apparatus (19) being located at the height of the maximum fluid level in the trough (1) and discharging sieved out solid components into the transport device (3).

18 Claims, 8 Drawing Sheets

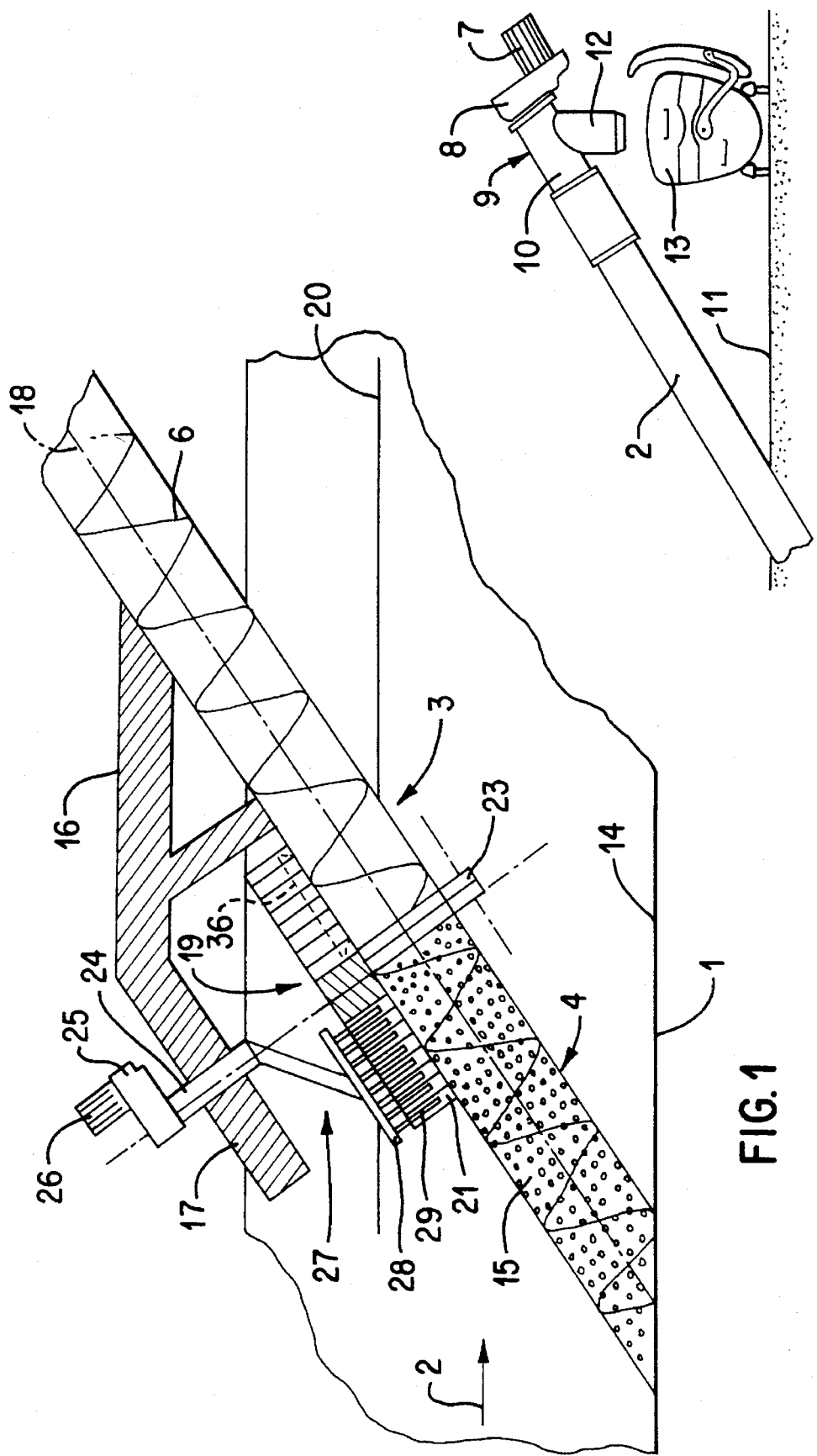

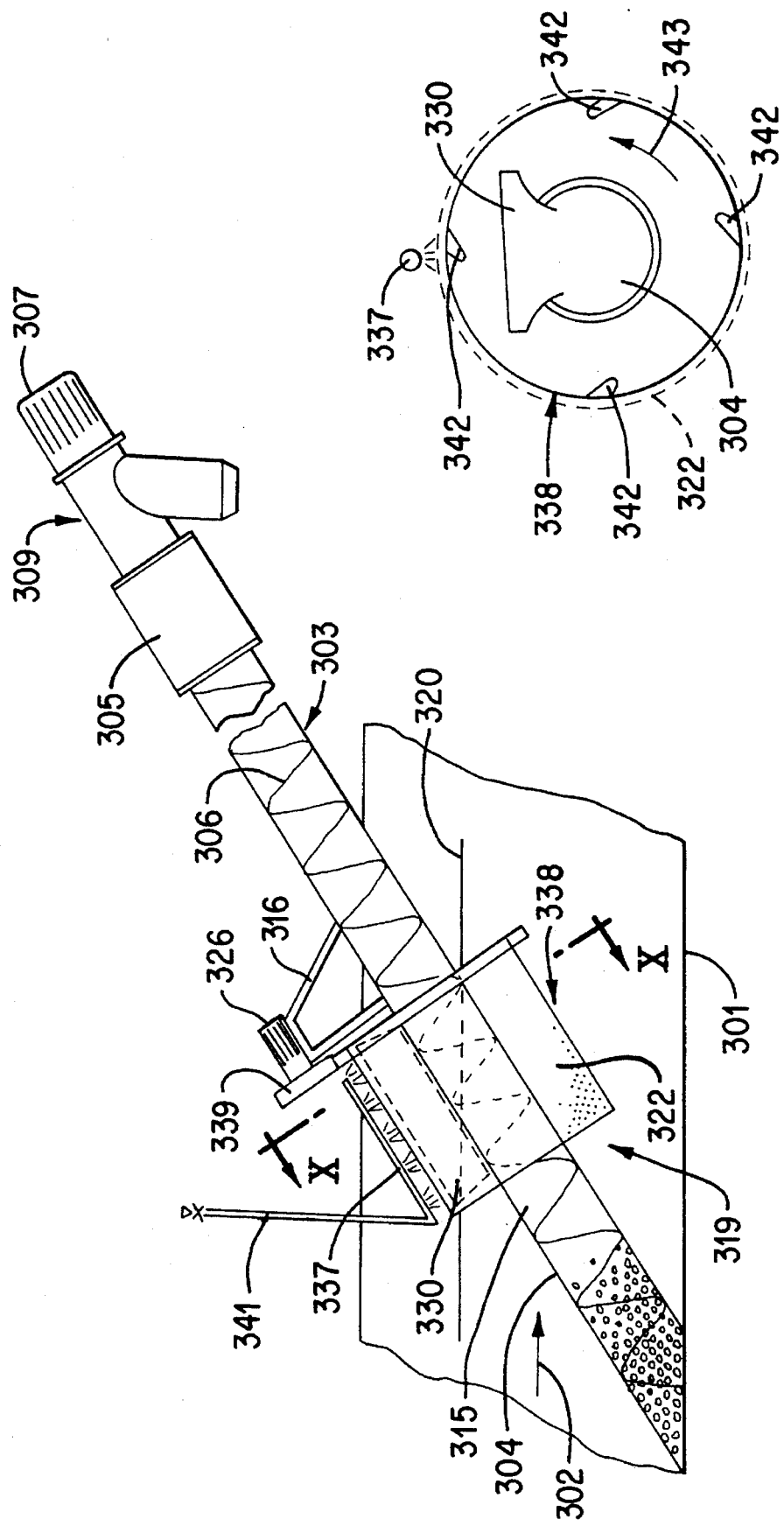

FILTRATION SYSTEM COMPRISING SIEVING TROUGH, HELIX AND ADDITIONAL SIEVING APPARATUS

BRIEF DESCRIPTION OF THE INVENTION

The invention relates to apparatus for removing solid components from a fluid, preferably from a fluid flowing in a trough, by a transport device which takes the form of a conveyor trough, which is preferably inclined to the trough at an angle of less than 90° and which has a rotatably driven transport worm or transport helix, the transport means having a solid material outlet at one end and a sieving surface located in at least portions of the opposite end, in which the solid components can be filtered out of the fluid and can be discharged by means of the transport worm or transport helix in the axial direction of the transport means to the solid material outlet.

BACKGROUND OF THE INVENTION

Such apparatus is known from the prior art. For example, there is available such apparatus which consists of a conveyor trough and a conveyor pipe which are located coaxially one behind the other and within which a transport helix is rotatably driven. The transport trough of this previously known apparatus consists of a sieve plate having a semi-circularly curved cross-sectional shape. The helix is so positioned in the sieve plate that solid components deposited on the sieve plate are transported by the helix in the axial direction of the apparatus and are discharged at a discharge end of the apparatus. Such devices are used in communal and industrial water treatment installations, in paper manufacturing, slaughter houses, fish and food industry plants, textile factories, tanneries, chemical and pharmaceutical industry plants or sewage disposal plants. The purpose of such apparatus is to carry out fine filtering of waste water, slurry sieving or flotation screening. However, by means of such apparatus there also is feasible the cleaning of process and recycling water, the conditioning of cooling water, or the recovery of raw materials. To this end the above-described apparatus is positioned in a trough which device extends generally horizontally with a slight downward slope, the width of the trough generally corresponding to the cross-section of the transport trough. The transport trough extends to the base of the trough. The fluid which is to be cleaned flows through the perforated sieve surface, while the coarse and fibrous material contained in the fluid stream are retained in the sieve portion of the transport trough. The sieve portion of the transport trough is cleansed by the adjacent helix. The washing effect achieved by this technique has the effect that organic components, for example, remain largely present in the water, whereas solid components in the form of impurities are removed. The helix transports the sieved material through the transport pipe to an outlet where the removed solid components can be packed in bags, for example.

A disadvantage of this known apparatus is that only relatively small quantities of fluid can be processed, because the diameter of the transport trough relative to the helix or worm cannot be made arbitrarily large due to manufacturing considerations. Consequently the effective sieve surface is dependent upon the structurally determined limitation of the helix, or worm diameter. It has also become apparent that the tolerances between the helix or worm and the transport trough or transport pipe increase as the diameter of the worm or helix increases. However, with increasing tolerances the output capacity of the above-mentioned apparatus becomes inadequate. Due to large tolerances, only a fraction of the solid components is removed, while a large part of the solid components remains on the sieve surfaces and clogs these, so that the apparatus has to be shut down and cleaned. Practical dimensions of such a worm or helix, or of the trough into device which these components extend, range up to a diameter of 600 mm. Due to these dimensions and the rate of rotation of the helix or worm the operating capacity of such apparatus is limited so that only a predetermined quantity of fluid flow can be treated during a given time period.

SUMMARY OF THE INVENTION

In the prior art there is further known such apparatus in which the effective sieve surface was enlarged by lengthening the transport trough with constant diameter so that it extends farther into the trough. However, in this embodiment, problems arise due to the back-up of fluid in the input region. Thus it has become apparent that the performance limit of such a helix or worm can be found in that the solid material which is transported upwardly from the lower region of the sieve by the helix or worm plugs-up the upper region of the sieve when too large a quantity of solid material is supplied to this apparatus. Outflow of fluid in the upper region was no longer achievable in this manner so that the desired sieve effect stopped and accumulations of the supplied fluid took place.

It is a further drawback of the previously known apparatus that such apparatus is designed for uniform fluid flow. However, when using such apparatus in water purification plants, the available fluid quantity of waste water is correspondingly small, for example, during dry weather or at night. On the other hand, during heavy rain storms or at certain times of day, the waste water quantity can amount to 50 times the previously mentioned minimal supply. However the known apparatus is designed for a supply midway between these two previously mentioned extreme values. If such apparatus is designed for peak demand, with the size of the trough and the helix or worm designed correspondingly, the effect is that only a low flow velocity occurs when there is little waste water supply so that the solid materials deposit on the bottom of the trough and the desired cleaning effect by the worm or helix cannot be achieved. In the trough, there then form solid material deposits which reduce the flow cross-section of the trough and which can lead to malfunction of the apparatus being used.

Given this prior art, the invention is based on the objective of providing apparatus of the type under consideration, which takes into account the prevailing conditions and problems, and which is capable of processing a suddenly increased fluid supply without clogging the sieving devices that are used or having to divert excess fluid into an emergency trough.

The achievement of this stated objective involves, in apparatus of this type, providing a transport means between the solid material discharge and the sieve plate located at the inlet in the transport direction which has a sieving apparatus whose sieve area when projected upon the transport means is greater than the diameter of the transport pipe, this sieving arrangement being located at the level of the highest fluid level in the trough and filtered-out solid components being discharged into the transport means, the trough being correspondingly enlarged in the region of the sieving apparatus.

Accordingly, apparatus according to the invention has an additional sieving surface which is located in the region of the highest fluid level. This confers the advantage that, with increasing fluid input, there is operative not only the sieving surface of the transport trough known in the prior art, but the sieving surface according to the invention also operates, straining out the additional solid components and discharging them into the transport trough, from where the solid components are transported by the helix or worm to the solid material outlet.

According to a further characteristic of the invention, provision is made to have the sieving apparatus span the full width of the trough. It is particularly advantageous to have this sieving apparatus include a discharge device which transports the solid components that are separated on the sieving apparatus into a funnel which connects the sieving apparatus to the transport means. In this manner one makes sure that the entire quantity of the screened-out solid components ends up in the operating portion of the helix or worm in the transport means, the screened-out solid components being introduced through the funnel into the transport means at a predetermined point in order to achieve optimum removal of the solid components.

In the previously described embodiment of the invention, provision is made to locate the funnel above the highest fluid level. This ensures that the funnel receives only those solids collected by the discharge device and supplies those to the transport means. In this manner the fluid does not get into the funnel, so that the moistness of the solids is not thereby increased.

To obtain the largest sieving surface inside the trough and at the same time supply to the funnel through the sieving apparatus only screened-out solid components, it is necessary to recess that part of the sieving apparatus which is positioned above the funnel and to locate it above the highest fluid level. It has therefore proven advantageous to construct the apparatus embodying the invention in such a manner that the sieving apparatus has the major part of its volume located below the highest fluid level. Especially advantageous sieving results were achieved when two-thirds of the sieving apparatus were located below the highest fluid level.

It has further proven advantageous to position the transport helix or transport worm in the region of the trough inside a transport trough whose outer surface consists of a sieve plate of semi-circular cross-section. In this region, the transport trough is sealed against the side walls of the trough so that all the fluid flows through the outer wall of the transport trough which is in the form of a sieve plate. In the region above the portion of the apparatus embodying the invention which is positioned in the trough, there can be located either a transport trough or a transport pipe. However it has proven advantageous to use a transport pipe because this makes it possible to provide greater stability for the helix or worm. This stability leads particularly to more uniform movement of the helix or worm because the helix or worm is supported on all sides in the region of the transport pipe, so that the outer ends of the helix or worm contact the inner surface of the transport pipe. This enables the funnel to discharge the screened-out solid components into the transport means either in the region of the open transport trough, or in a portion of the transport pipe which is opened for that purpose.

In accordance with a further characteristic of the invention, the outside of the transport helix or transport worm is provided with a brush or the like, which is composed of a brush body and a plurality of bristles mounted on the brush body. This brush continuously cleans the sieving surface, so that plugging up of the sieve holes is prevented and the apparatus achieves substantially enhanced efficiency.

According to the invention the spaces between the bristles of the brush are filled with a rubber mass. It is further advantageous to have the bristles and/or the rubber mass enclosed in a rubber covering so that there is mounted on the brush body a rubber body with embedded bristles.

Finally it has been found especially advantageous to have the rubber mass and/or the rubber covering consist of a two-component rubber which abrades along with the bristles. When so constructed, the brush provides very effective cleaning with little loss of bristles.

The sieving apparatus preferably has a sieve plate and a discharge device in the form of a rake or the like, which is powered and which moves solid components deposited on the plate into the funnel. In a first advantageous embodiment of the invention, the sieve plate is of circular shape and the rake or the like is driven in rotation about the central axis of the sieve plate. This enables the continuous discharge of the solid components deposited on the sieve plate into the funnel, which is located in the upper region of the sieve plate. By selecting the rate of rotation of the motor which drives the rake, the cleaning frequency of the sieve plate can be adjusted to conform to the supply of solids.

In a second embodiment of the invention, the sieve plate is of rectangular shape and the rake or the like is movable along a track which extends parallel to one edge of the sieve plate. Here it has proven to be particularly advantageous to locate this track parallel to the axial direction of the transport trough, so that the deposited solid material is transported by the rake or the like along the sieve plate parallel to the transport trough before the solid is introduced via the funnel into the transport trough or a transport pipe which may be positioned above it.

In this form of the invention it is further advantageous to provide a funnel-shaped trough on both sides of the transport trough, into which the solid components are pushed by the rake or the like which is led parallel to the transport trough, and from where the solid components get into the funnel. An improvement of the transportation of the solid components in the funnel troughs is achieved by locating, above the funnel-shaped trough, a nozzle arrangement which moves the components that are pushed into the funnel troughs into the transport trough, either by process water or by an air stream.

In a second possible version of the second embodiment, the track extends at right angles to the axial direction of the transport trough. To prevent too great a quantity of fluid from reaching the transport trough in this embodiment, it is a further characteristic of the invention that the sieve plate is made in two pieces and the halves are located on both sides of the transport trough, and these halves of the sieve plate are positioned at an angle to the funnel, so that the solid components are displaced against the force of gravity. By such positioning of the two halves of the sieve plate, one makes sure that the fluid impinging on the sieve plate halves is not discharged into the transport trough by the rake or the like, but returns to the fluid stream under the force of gravity.

In the previously described versions of the second embodiment, it is advantageous to make the track in the form of a loop. It has further been found advantageous to provide a track on both sides of the transport trough, by each of which a rake or the like is movably guided. The rakes or the like are guided by the tracks which are in the form of loops and are powered by at least one drive motor. The transmission of power from this drive motor to the rakes can take place in various ways. Envisioned are positive and frictional force-transmitting elements as, for example, chain drives, rack and pinion, belt drives, or the like. By forming the tracks as loops it becomes especially easy to achieve the advantage that reversing of the drive motor can be avoided. Rather, the rakes are continuously displaced in one direction so that they transport the solid components from the sieve plate into the funnel essentially during one half of a turn around the loop.

In a third embodiment of the invention the sieving apparatus takes the form of a rotatably driven drum sieve, at whose central axis the transport trough is located. Preferably, the drive of the drum sieve is achieved by providing the drum sieve in the region of its head end with a crown gear which engages a drive pinion driven by a motor. Compared with the previously described embodiments of the invention, the drum sieve has the advantage that its effective sieve surface is larger, so that it can accept a larger quantity of solid components. The solid components are deposited on the inner surface of the drum sieve and are transported into a region above the highest fluid level through the rotation of the drum sieve, from where the solid components get into a funnel located inside the drum sieve and are transported to the solid material discharge by the worm or helix located below the funnel.

Here it has proven advantageous to locate a nozzle arrangement above the drum sieve parallel to the axial direction of the drum sieve, by means of which the solid components which adhere to the inner surface of the drum sieve in the region of the funnel are rinsed off (with process water) or are blown away by a compressed air stream. Accordingly, the nozzle arrangement is located opposite the funnel.

Finally it has been found advantageous to make the discharge device controllable as a function of the quantity of fluid supply. Accordingly the drive for the drum sieve or the drive for the rakes or the like is turned on only when the fluid level has reached an appropriate height which requires activation of the additional sieving apparatus.

The invention further relates to a process for removal of solid components from a fluid which is preferably flowing in a trough, in which the fluid is directed onto a helical sieve which consists of a rotatably driven transport helix or transport worm, inside a transport pipe which, at least in portions of its surface, takes the form of a sieving surface and/or a transport trough, the solid components being screened out from the fluid by the sieving surface and subsequently carried by the transport helix or transport worm in the axial direction of the transport pipe and/or the transport trough to a solid material outlet.

In accordance with the invention, in this process the fluid, depending on its quantity, is passed through a sieving apparatus which is located between the solid outlet and the sieving surface in the region of highest fluid level in the trough, the sieving apparatus having a bigger active sieving surface compared with the sieving surface of the transport pipe or transport trough. In addition, the solid components screened out by the sieving apparatus are discharged into the transport pipe or the transport trough.

In such a process, it is particularly advantageous to be able to control the discharge of solid components from a fluid, e.g. a solid-fluid mixture, as a function of the quantity of the solid-fluid mixture which is to be cleaned. In so doing, when there is little fluid supply, the fluid is supplied only to the sieving surface located in the transport pipe or in the transport trough. If the fluid quantity then increases, depending upon the quantity of the fluid, there can be activated that sieving apparatus which is located between the solid material outlet and the sieving surface in the region of the highest fluid level in the trough. The solid components which are screened out by this sieving apparatus are then introduced into the transport pipe or the transport trough, and through it are discharged together with the solid components which are screened out by the sieving surface in the transport pipe, or screened out in the transport trough and removed via the transport worm or the transport helix.

According to a further characteristic of the process according to the invention, the sieving apparatus has discharge devices which are activated at a predetermined fluid level. This preferably involves rakes which are driven by a motor and are guided along the sieving apparatus. A substantial energy saving is achieved because these discharge devices are only operated when an appropriate quantity of fluid must be purified, that is, a predetermined fluid level is reached inside the trough.

The activation of the discharge devices can be achieved in advantageous manner, e.g. by sensors which are located in the region of the trough and which control the activation of the discharge devices in response to a rise in the fluid level. It is also possible to control the discharge devices in a simple manner by means of floats which, at a predetermined fluid level, close an electrical circuit in which the discharge devices are connected.

To ensure problem-free functioning of the process embodying the invention, it is contemplated according to a further characteristic of the invention that the sieving surface and the sieving apparatus are cleaned with a brush or the like which is mounted on the transport helix or transport worm and which rotates with same. By such a cleaning tool there are removed the solid components which are caught during operation in the sieve holes of the sieving apparatus or the sieving surface and thereby cause plugging of this part of the structure. In so doing it has been found to be particularly advantageous to clean the sieving surface and the sieving apparatus with a brush which has a plurality of bristles, which are mounted on a brush body of metal or plastic, the bristles being surrounded by a rubber mass which wears off during cleaning.

To clean sieve perforations, e.g. in sieve raking devices, there are normally used brushes with plastic bristles or steel bristles. These bristles are subject to relatively heavy wear and tear because they constantly protrude into the sieve holes and frequently become buckled. Due to this mechanical stress, the bristles break off after a certain time or are torn out of the brush body. The alternative use of rubber scrapers for cleaning sieve holes has not proven to be practical because the rubber scrapers do not open up the holes in the sieves, but rather push the solid particles which are to be removed into the holes, and in this manner there is achieved the exact opposite, namely further dirtying of the perforated sieve.

In contrast, because of its better wear properties, a rubber substance has significant advantages compared to the plastic or steel material used for the brushes. Accordingly it is especially advantageous to cast the bristles in a two-component rubber so that the bristles form a homogenous structure together with the rubber mass. In the production of such a brush the rubber mass flows into all the spaces between bristles until it sets. The rubber mass is specially designed so that, during cleaning of the sieving surface and the sieving apparatus, it wears to the same extent as the individual bristles. In that case, the rubber mass in its hardened state acts on the one hand as an elastic but firm connection of the individual bristles with the brush body and the brush core, which is most often made of steel wire, and on the other hand as an elastic support frame for the bristles outside the brush body. Because the rubber mass outside the brush body wears down in step with the bristles, it substantially increases the life of the bristles. Breaking off of the bristles through frequent back and forth bending is prevented by the rubber mass. Thus the bristles fulfill their true purpose, namely to poke open the holes of the perforated sieve. On the other hand, the bristle hairs embedded within the brush body in the rubber mass are firmly attached to each other by the rubber mass, so that the individual bristles can no longer be pulled out of the brush body.

Other characteristics and advantages of the invention appear from the following description of the appended drawing, in which preferred embodiments of the invention are illustrated.

BRIEF DESCRIPTION OF THE DRAWINGS

FIG. 1 the lower portion in sectional side view of a first embodiment of apparatus according to the invention for removing solid components from a fluid, FIG. 2 the upper portion of the apparatus according to FIG. 1 in side view;

FIG. 9 a fourth embodiment of the apparatus for removing solid components from a fluid in a partially sectioned side view;

FIG. 10 the apparatus according to FIG. 9 in a side view along line X—X in FIG. 9 and FIG. 11 a brush for cleaning the sitting surface and the sieve apparatus in a cross sectional side view.

DETAILED DESCRIPTION OF THE PREFERRED EMBODIMENTS

Figure 3:
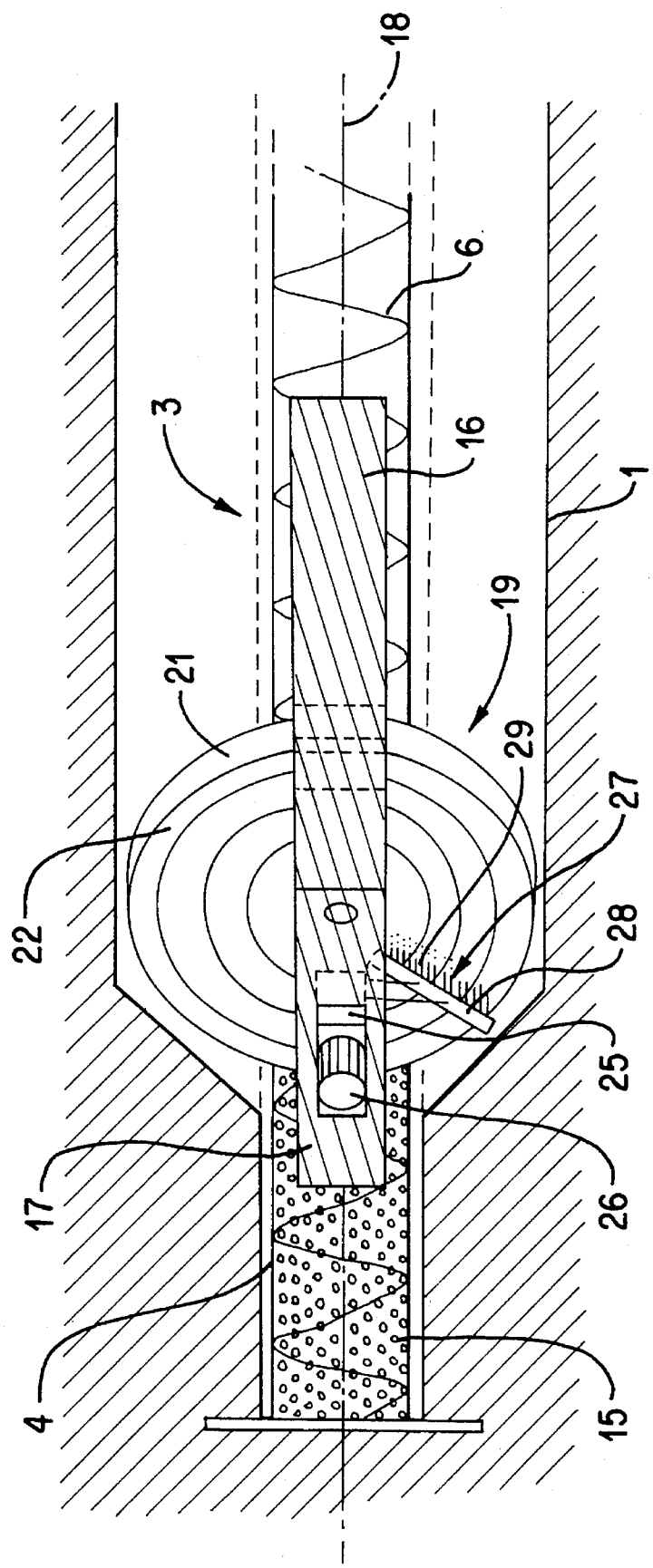
FIG. 3 the apparatus according to FIG. 1 in cross sectional top view.

In FIGS. 1 to 4 there is shown a first embodiment of apparatus for removing solid components from a fluid. The apparatus is located in a trough 1 in which a fluid flows in a direction indicated in FIG. 1 by arrow 2. The apparatus consists of a transport means 3 which includes a transport trough 4 and a transport pipe 5 (see FIG. 2). In the transport trough 4 and the transport pipe 5 a helix 6 is rotatably located which is driven by a motor 7 (see FIG. 2). The motor 7 transmits its turning moment via gears 8 to helix 6. Transmission 8 is attached to one end of the transport means 3, namely the transport pipe 5, with the transport pipe 5 having a solids outlet 9 which consists of a flanged pipe segment 10 and a second pipe segment 12 oriented perpendicularly to bottom 11. Below pipe segment 12 there is located a receptacle which receives the solid components discharged by solids outlet 9.

The transport trough 4 which is located at the end of transport means 3 opposite the solid outlet 9 extends to the bottom surface 14 of trough 1 and consists of a sieve plate 15 which is shaped with semi-circular cross-section. The diameter of the transport trough 4 corresponds essentially to the width of trough 1. Between the side surfaces of trough 1 and the transport trough 4 there are located sealing elements which have not been shown and which prevent flow of the fluid bypassing the transport trough 4.

The sieve plate 15 of transport trough 4 has a plurality of perforations whose diameter is determined as a function of the solid components which are to be sieved out.

Above the transport means 3 there is provided a support frame 16 which is attached on the one hand to the transport trough 4 above sieve plate 15 and on the other hand has a cantilevered arm 17 which extends parallel to the longitudinal axis of the transport means 3.

Transport means 3 further has a sieving apparatus 19 which is located between the solid outlet 9 and the sieve plate 15 located at the inlet to the transport paths, the sieving apparatus 19 being located at the level of the highest fluid level in trough 1 and discharging sieved out solid components into the transport means 3. The height of the highest fluid level is represented in FIG. 1 by a line 20.

A brush 50 is connected to transport helix 6 in such manner that the brush 50 rotates together with transport helix 6 and wipes the sieve plate 15 so that solid components which are not transported by the transport helix 6 are removed from sieve plate 15 and are introduced into the transport path of transport helix 6. Brush 50 is attached to a single turn of the helix on the outside and encircles the entire turn. However it is also possible to locate a continuous brush 50 in the entire region of the transport helix 6 located in the region of sieve plate 15. The construction and operation of brush 50 will be further described below with reference to FIG. 11.

In what follows the construction of the sieving apparatus 19 is described in detail.

The sieving apparatus 19 consists of a flat cylindrical housing 21 containing a sieve plate 22. The sieving apparatus 19 is attached by an attachment 23 to the transport means 3 below the cantilevered arm 17. In cantilevered arm 17 a shaft 24 is rotatably supported which is connected to a motor 26 for driving by a transmission 25. Facing away from the driving side, an outlet device 27 is attached to shaft 24 which has a rake 28. The rake 28 has a plurality of teeth 29 which are displaced along a circular track within housing 21 of the sieving apparatus 19. The length of rake 28 corresponds approximately to the length of half the diameter of the circularly shaped sieve plate 22.

The teeth 29 of rake 28 extend into the housing 21 of sieving apparatus 19 far enough so that they slide over sieve plate 2 and thereby transport solid components deposited on the sieve plate along the circular paths which they describe.

Above line 22 of the highest fluid level there is located in housing 29 of sieving apparatus 19 a funnel 30 which has a recess in its surface which fits into the sieve plate 22. The funnel 30 is connected on the outlet side with the transport trough 4 so that the solid components which are transported by the teeth 29 of rake 28 along their circular paths within housing 21 drop into the transport trough 4 via funnel 30 and are then transported by the helix 6 in the direction of the solid outlet 9 from where they are poured into receptacle 13.

Figure 4:
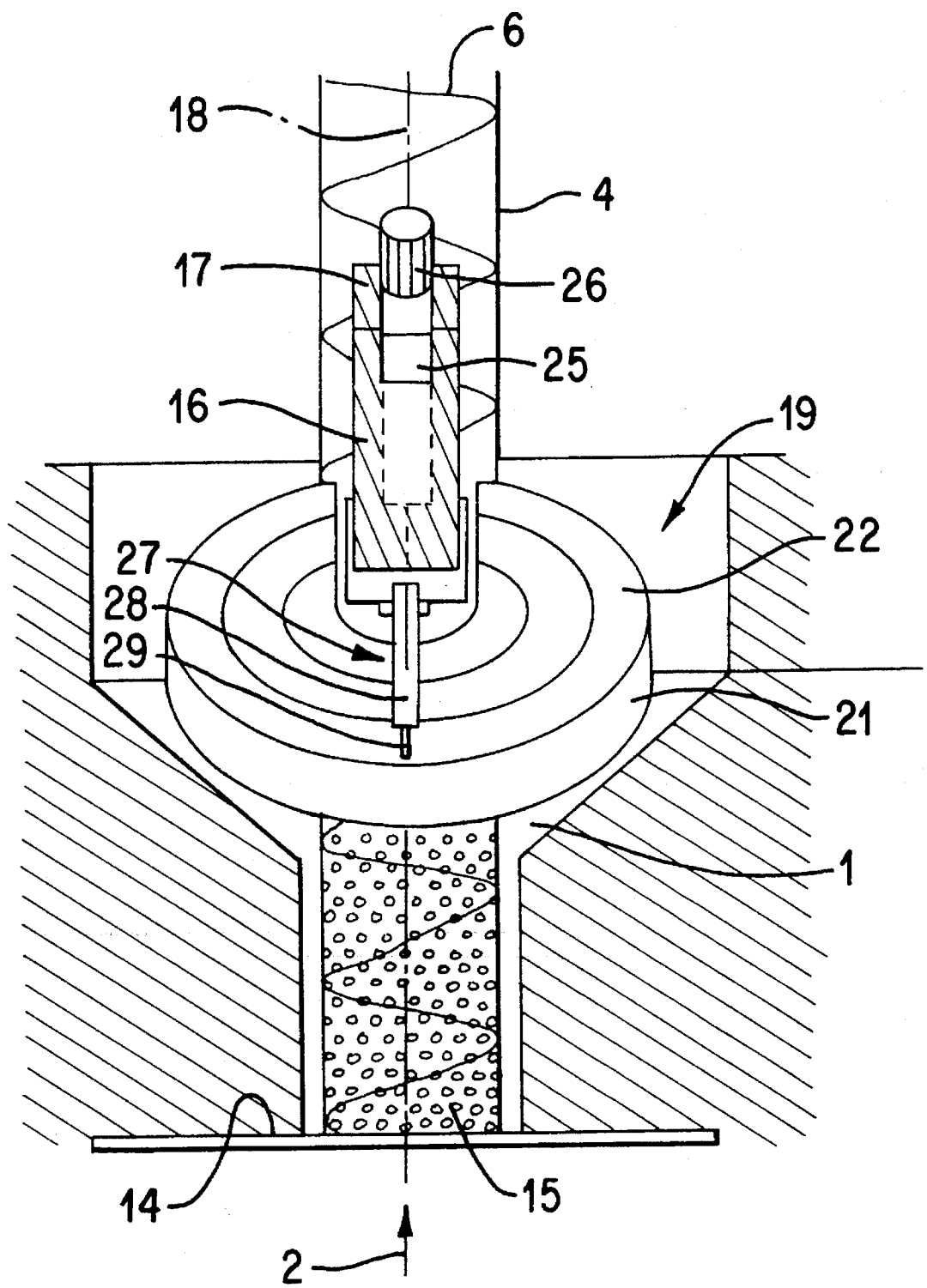
FIG. 4 the apparatus according to FIGS. 1 to 3 in sectionally represented front view.

As can be seen in FIGS. 3 and 4, trough 1 is enlarged in the region of sieving apparatus 19 correspondingly to the diameter of housing 21, so that a correspondingly increased fluid input can be sieved both by the sieve plate 15 of transport trough 4 as well as by sieve plate 22 of sieving apparatus 19 and thereby freed of solid components.

Figure 5:
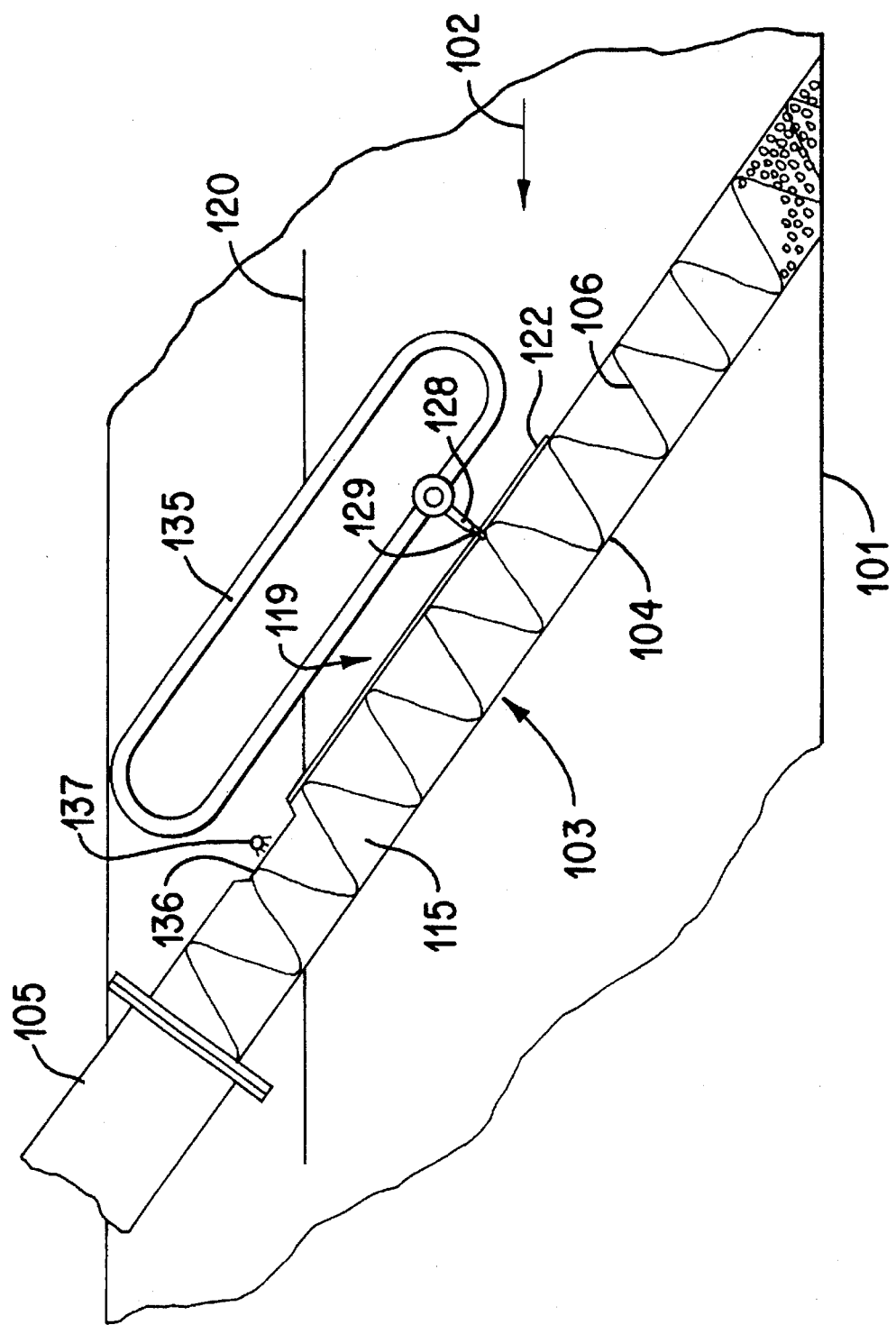
FIG. 5 a second embodiment in side view of the apparatus according to the invention for removing solid components from a fluid.
Figure 6:
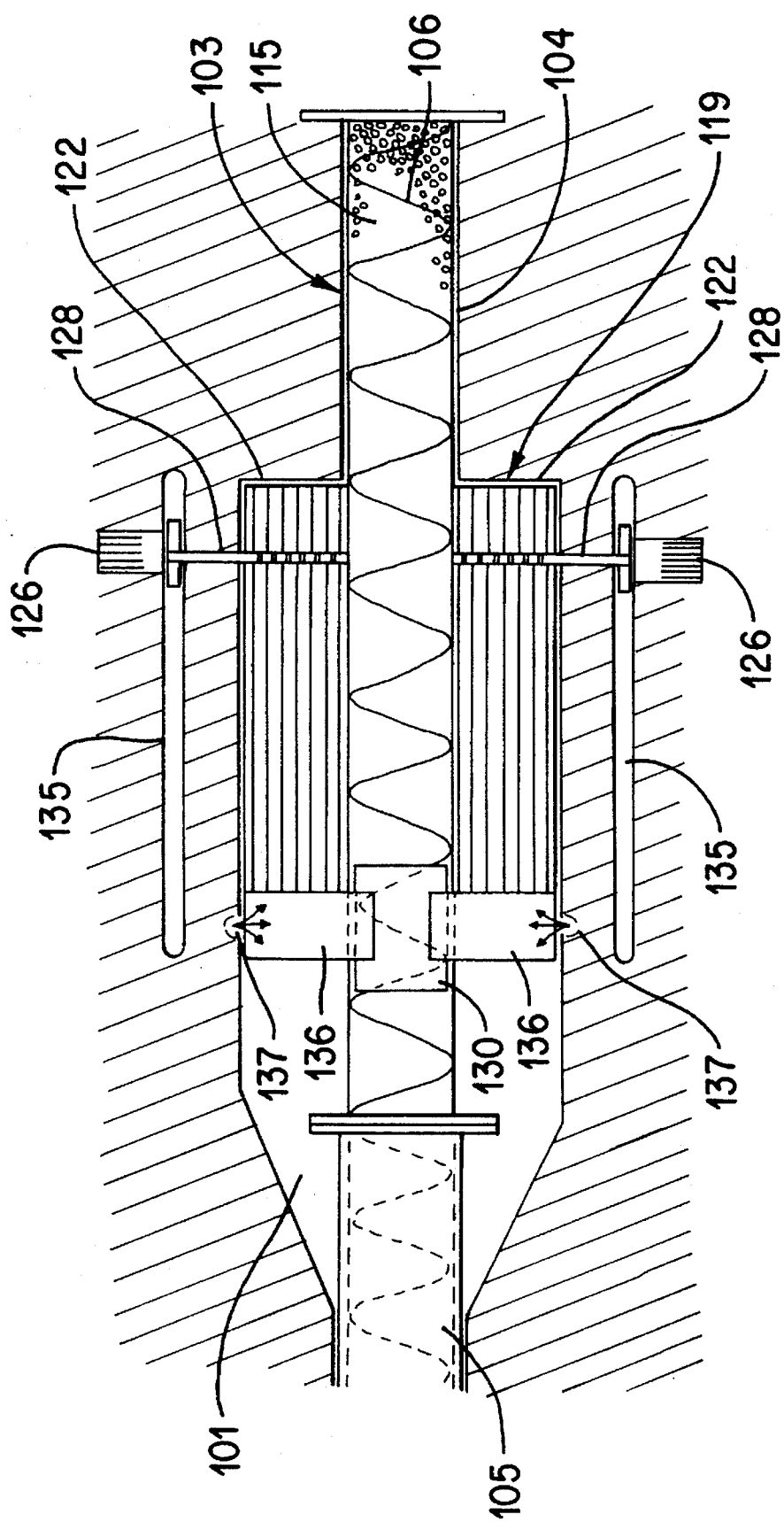
FIG. 6 the apparatus according to FIG. 5 in a top view.

In FIGS. 5 and 6, there is shown a second embodiment of the apparatus for removing solid components from a fluid. This apparatus is located in a trough 101 and consists of a transport means 103. The transport means 103 has a transport trough 104 and a transport pipe 105 coaxial with transport trough 104, a helix 106 being rotatably located in transport trough 104 and transport pipe 105, which is driven by a motor not illustrated. The transport pipe 105 has a solid outlet which is not illustrated at its free, not illustrated end. The transport trough 104 consists of a sieve plate 115 which is made with semi-circular cross-section. The transport means 103 is inclined at an angle in the direction of the fluid flow represented by an arrow 102 in trough 101.

The construction of transport means 103 and of trough 101 correspond essentially to the construction of the transport means 3 and the trough 1 according to FIGS. 1 to 4.

On both sides of transport trough 104 there is attached respectively a sieve plate 122 which is of rectangular shape. Parallel to the transport trough 104 there extend on both sides of the transport trough 104 guides in the form of looped tracks which respectively guide in loop movement a rake 128 which slides along sieve plate 122. The rakes 128 located on both sides transport correspondingly located solid components deposited on sieve plates 122 which have been sieved out of the fluid stream in the direction of two funnel shaped troughs 106 respectively located at the upper end of sieve plates 122 from where the solid components are delivered to a funnel 130 which is located above helix 106 in transport trough 104. As can be seen especially in FIG. 5 the funnel 130 is located above the highest fluid level which is indicated by a line 120.

To improve the transport of the solid components transported into funnel shaped trough 136 via sieve plates 122 each funnel shaped trough is provided with a nozzle apparatus 137. The nozzle apparatuses 137 are therefore located at the edges of funnel shaped trough 136 opposite funnel 130. The nozzle apparatuses 137 can be operated by process water or by a stream of air.

The drive for both rakes 128 is provided by a respective drive motor 126 which transmits its turning moment, for example, to an endless circulating chain having an entraining member to which a rake 128 is attached. So equipped, each rake 128 is displaced along the guide in the form of a looped track in such manner that, during movement of helix 106 in the direction of transport, it contacts the respective sieve plate 122 with its teeth 129 and transports the solid components there accumulated in the direction of transportation of helix 106 to the funnel shaped trough 136 and ultimately to the funnel 130.

Figures 7, 8:
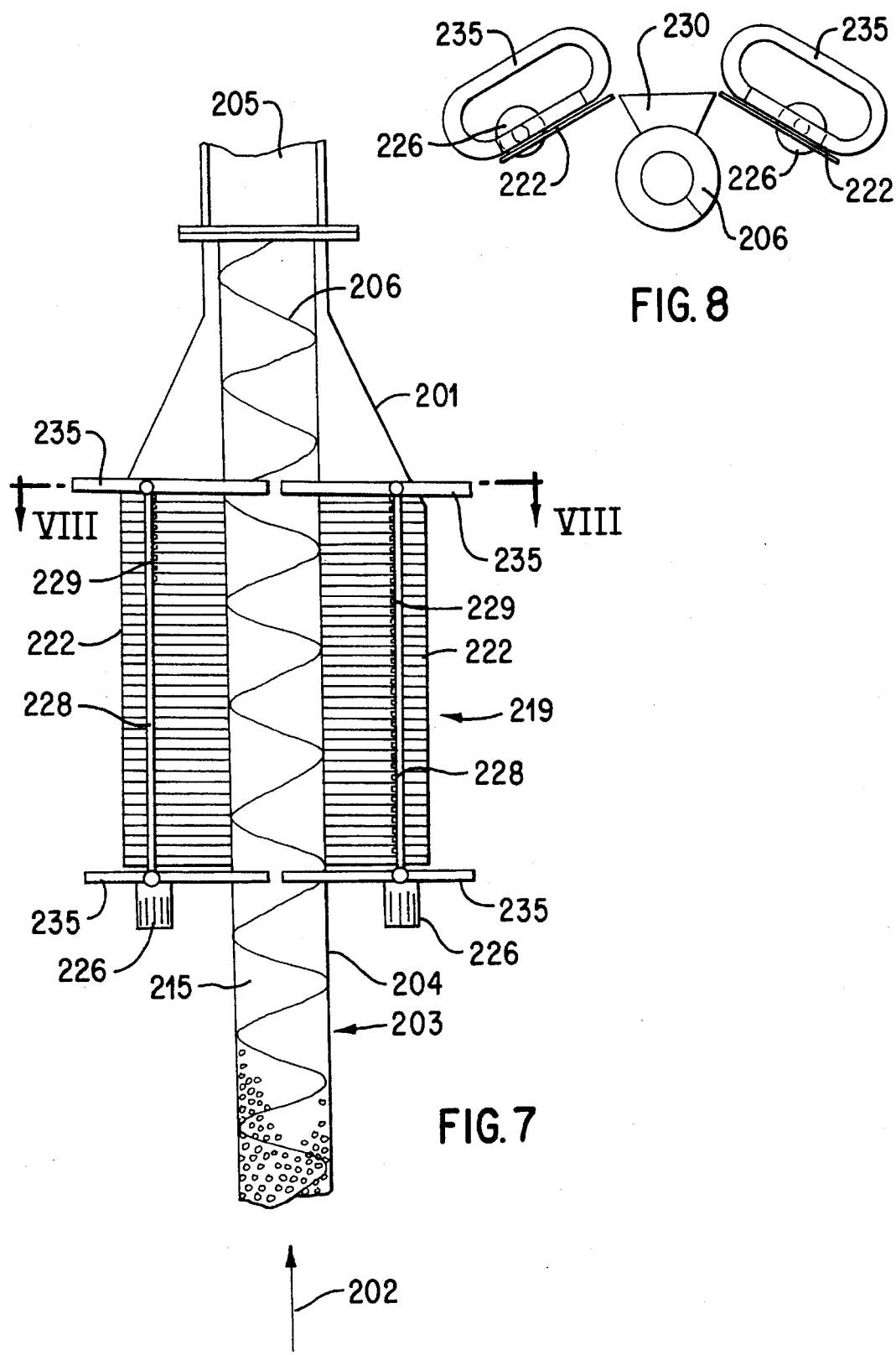
FIG. 7 a third embodiment of the apparatus for removing solid components from a fluid in a top view.
FIG. 8 the apparatus according to FIG. 7 in a side view along line VIII—VIII in FIG. 7.

A further embodiment of the inventive apparatus for removing solid components from a fluid is shown in FIGS. 7 and 8. In this embodiment there is also provided a transport means 203 in a trough 201 which consists of a transport pipe 205 and a transport trough 204, the transport trough 204 having a sieve plate 215 which is of semi-circular cross section. On both sides of transport trough 204 there is attached a respective sieve plate 222, the trough 201 having a width in this region which corresponds to the sum of the widths of both sieve plates 222 and the diameter of transport trough 204. Above transport trough 204 there are located on both sides two guides 235 in the form of circulating tracks. The guides 235 extend perpendicularly to the central axis of transport trough 4. A rake 228 is located between every two guides 35 located at the oppositely positioned ends of sieve plates 222 which is displaced by a motor 226 along the circulating tracks. The rake 228 is so constructed that its teeth extend to the sieve plate 222 and scrapes from the sieve plate the solid components which have been deposited there and transports them into funnel 230 which is located between the two opposing sieve plates above the helix 206.

To prevent the discharge into the funnel 30 of portions of the fluid together with the solid components deposited on sieve plates 222 the sieve plates 222 are joined to funnel 230 at an angle so that the solid components must be displaced by the rakes 228 against the force of gravity. As a result fluid reaching the sieve plates 222 flows downwardly through centrifugal force and returns in this manner to trough 201.

The movement of rakes 228 along the guides 235 in the form of circulating tracks takes place through movements which are analogous to those previously described in relation to the exemplary embodiment according to FIGS. 5 and 6.

Finally there is shown in FIGS. 9 and 10 a further exemplary embodiment of the inventive apparatus for removal of solid components from a fluid, in which the sieving apparatus 319 takes the form of a drum sieve 338 in whose central axis the transport trough 304 extends, which has a sieve plate 315 which is formed with semi-circular cross section. In previously described manner a transport pipe 305 is connected to the transport trough 304 which opens into a solid outlet 309. In the transport trough 304 and the transport pipe 305 which jointly constitute the transport means 303, there is rotatably positioned a helix 306 which is driven by a motor 307. The transport means 303 extends with its transport trough 304 into a trough 301 in which a fluid flows in the direction of an arrow 302. From FIG. 9 it will be recognized that the transport means 303 is located in trough 301 inclined at an angle in the direction of the fluid flow.

The drum sieve 338 consists of a sieve plate 322 which is essentially cylindrically curved. The drum sieve 338 is so positioned in trough 301 that the major portion, namely two-thirds of its volume, is located below a maximum fluid level indicated by line 320 in FIG. 9. The trough 301 has an enlarged shape in the region of the drum sieve 338 so that the drum sieve 338 rotates within a recess formed by trough 301. Otherwise the trough 301 has a width in the region below the drum sieve 338 which corresponds substantially to the diameter of transport trough 304. In the direction of flow behind the sieving device 319 the trough 301 can be of widened shape.

The drive of drum sieve 338 takes place by means of a motor 326 which actuates a drive pinion 339 via a transmission which is not shown and which meshes with a crown gear drive 340. The crown gear drive 340 is fixedly connected to the enclosing surface or the head end of the drum sieve 338. In so doing it has proven advantageous to weld the crown gear drive 340 either to the enclosing surface or to a head end of the drum sieve 338.

From FIG. 9 it will be apparent that the motor 326 is attached to a support frame 316 which in turn is located on the transport means 303.

Between the enclosing surface of drum sieve 338 and the open side of transport trough 304 a funnel 330 is so arranged that its major portion is positioned above the highest fluid level indicated by line 320. In the region of funnel 330 there is located outside drum sieve 338 a nozzle apparatus 337 which is connected to a process water conduit 341 and has several nozzles located along the nozzle apparatus 337. As can be seen in FIG. 9 the nozzle apparatus 337 is located parallel to the longitudinal axis of drum sieve 338.

In FIG. 10 it can be seen that four entraining members 342 are attached to the inner enclosing surface of drum sieve 338, of which two are respectively located diametrically opposite each other. The direction of rotation of drum sieve 338 is represented in FIG. 10 by an arrow 343.

The removal of solid components from a fluid flowing in trough 301 is due to the fact that a portion of the solid components is already sieved out through sieve plate 315 and transported via helix 306 in the direction of the solid outlet 309. Upon large fluid input the level in trough 301 rises to the maximum marking indicated by line 320, whereby a portion of the fluid now flows through the rotatably driven drum sieve 338. The solid components contained in this fluid are separated out on the internal enclosing surface of drum sieve 338 and are transported by the rotation of drum sieve 338 and entraining members 342 into the region of the drum sieve 338 above funnel 330. By continuously spraying the outer enclosing surface of drum sieve 338 the solid components which adhere to the inner enclosing surface of drum sieve 338 are loosened and transported into funnel 338 from where they are moved toward transport trough 304 and discharged through solids outlet 309.

The operation of the previously described illustrative embodiments according to FIGS. 1 to 8 takes place in similar manner. In each case the additional sieving apparatus 19, 119, 219 and 319 is controlled as a function of the fluid flow. Accordingly the additional sieving apparatus 19, 119, 219 and 319 is activated only when the level of the passing fluids requires an additional sieving apparatus.

The previously described invention is not limited to the embodiments illustrated. Rather changes and modifications are possible without departing from the scope of protection of the invention. In the apparatus according to the invention it is not of primary importance that the rake device be constructed above the highest fluid level but rather that there be provided an arrangement which acts as sieve or rake and which transports the sieved out solids into the transport helix.

By the previously described apparatuses there is performed a process for the removal of solid components from a fluid flowing in a trough 1, 101, 201 and 301 in which the fluid is directed onto a sieving helix which consists of a transport pipe 5, 105, 205 and 305 constructed with at least in parts of its surface as a sieving surface 15, 115, 215, 315 and/or a transport helix 6, 106, 206, 306, rotatably driven within a transport trough 4, 104, 204, 304. In this process the solid components are sieved out of the fluid by sieving surface 15, 115, 215, 315 and thereafter transported by transport helix 6, 106, 206, 306 in the axial direction of transport pipe 5, 105, 205, 305 and/or transport trough 4, 104, 204, 304 to the solid outlet 9, 309. In this process the fluid is led, as a function of its quantity to be cleansed, across sieving apparatus 19, 119, 219, 319, which is located between the solid outlet 9, 309 and the sieving surface 15, 115, 215, 315 in the vicinity of the maximum fluid level in trough 1, 101, 201, 301. The sieving apparatus 19, 119, 219, 319 has for this purpose an active sieving surface which is larger than the sieving surface 15, 115, 215, 315 of transport pipe 5, 105, 205, 305 or of transport trough 4, 104, 204, 304. The solid components sieved out by the sieving apparatus 19, 119, 219, 319 can thereafter be discharged into transport pipe 5, 105, 205, 305 or the transport trough 4, 104, 204, 304 via a funnel 30, 130, 230, 330.

The discharge devices 27, 127, 227, 327 of sieving apparatus 19, 119, 219, 319 are actuated, i.e. turned on, through the previously explained processes as a function of the fluid level. In so doing the sieving apparatus 19, 119, 219, 319 comes into use only when the fluid level has reached a height which no longer permits discharge of the solid components of the fluid only via the sieving surface 15, 115, 215, 315 of the transport means 3, 103, 203, 303.

At regular time intervals it is necessary to clean the sieving surface 15, 115, 215, 315 and the sieving apparatus 19, 119, 219, 319, that is to free it from solid components which have not been discharged. Furthermore the undischarged solid components have settled in the individual holes of the sieve. To clean the sieving surface 15, 115, 215, 315 and the sieving apparatus 19, 119, 219, 319 there is used a brush 50 shown in FIG. 11. This new brush 15 consists of a brush body 52 in whose longitudinal direction there extends a brush core 54. The brush body 52 is preferably U-shaped in cross section, with the brush core 54 made of steel wire extending between the two arms of the brush body 52. Around brush core 54 there are arranged a plurality of bristles 51 which emerge from it between the arms of the brush body 52.

Figure 11:
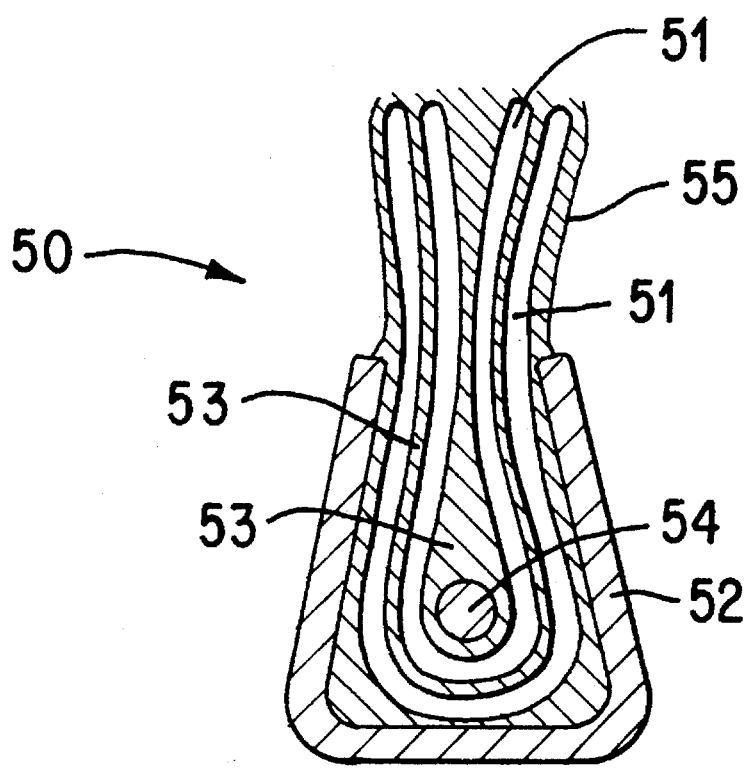

As can be seen in FIG. 11, the hollows between the individual bristles 51 are filled with a rubber mass 53. The rubber mass 53 consists of a two component abrasion rubber. It can further be seen that the bristles 51 are surrounded by a rubber mantle 55 which also consists of the previously two component abrasion rubber.

The rubber mass 53 and the rubber mantle 55 extend into the brush body 52 and also enclose the brush core 54.

In their hardened state the rubber mass 53 and the rubber mantle 55 act on the one hand as elastic but firm connection of the individual bristles 51 with the brush body 52 and the brush core 54. On the other hand the rubber mass 53 and the rubber mantle 55 provide an elastic support enclosure for the bristles 51 outside the brush body 52. When cleaning sieving surface 15, 115, 215, 315 and sieving apparatus 19, 119, 219, 319 the rubber mass 53 and the rubber mantle 55 wear down to the same extent as the bristles. Through the structural formation of the new brush according to FIG. 11 the life of the bristles 51 is substantially extended because a breaking off of bristles 51 through frequent back and forth bending is prevented by the rubber mass 53 and the rubber mantle 55. Because the bristles are harder than the rubber mass 53 and the rubber mantle 55 they nevertheless fulfill their purpose of poking the holes open. The bristles 51 embedded within brush body 52 in rubber mass 53 and rubber mantle 55 are firmly connected to each other by the rubber mass 53 and the rubber mantle 55 and therefore can no longer be pulled individually out of the brush body 52.

I claim:

1. Apparatus for removing solid components from a fluid, including a first trough in which said fluid is adapted to flow, a transport means in the form of a transport trough having an axial direction and circumference and which is inclined to the first trough at an angle of less than 90° and having a rotatably driven transport worm or transport helix, the transport means having at one end a solid material outlet and at the opposite end a sieving surface located across at least a portion of the transport means circumference, the sieving surface being adapted to sieve the solid components out of the fluid and discharge them to the solid material outlet via the transport worm or the transport helix in the axial direction of the transport means, characterized in that there being an additional sieving apparatus located between the solid material outlet and the sieving surface at the head of the transport means in the direction of transportation, said additional sieving apparatus having a sieving surface having a projection onto the transport means which is larger than the diameter of the transport trough, the additional sieving apparatus being located at a predetermined height above the bottom of the first trough and adapted to discharge sieved-out solid components from above said height into the transport means and in that the first trough is correspondingly widened in a region proximate additional sieving apparatus, wherein the additional sieving apparatus has a discharge device which transports the solid components sieved out of the additional sieving apparatus into a funnel from above said predetermined height, which connects the additional sieving apparatus with the transport means, and the additional sieving apparatus has a sieve plate and a discharge device substantially in the form of a rake which is powered and which transports solid components which are deposited on the sieve plate into the funnel.

2. Apparatus according to claim 1, characterized in that the sieve plate is of a circular shape and the rake is rotationally driven about the central axis of the sieve plate.

3. Apparatus according to claim 2, characterized in that the sieve plate is of rectangular shape and that the rake is movable along a track which extends parallel to one edge of the sieve plate.

4. Apparatus according to claim 3, characterized in that the track extends parallel to the axial direction of the transport trough.

5. Apparatus according to claim 4, characterized in that there is a second track and the tracks are located on both sides of the transport trough and on which each a rake is respectively movably guided.

6. Apparatus according to claim 5, characterized in that a funnel trough is located on both sides of the transport trough into which the solid components are pushed by the rake which are guided parallel to the transport trough, from where the solid components are delivered into the funnel.

7. Apparatus according to claim 6, characterized in that the discharge device is controllable as a function of the quantity of the fluid supply.

8. Apparatus according to claim 5, characterized in that a nozzle arrangement is located above the funnel trough.

9. Apparatus according to claim 5, characterized in that the discharge device is controllable as a function of the quantity of the fluid supply.

10. Apparatus according to claim 3, characterized in that the track extends at right angles to the axial direction of the transport trough.

11. Apparatus according to claim 10, characterized in that the sieve plate is formed in two parts and the two parts are located on both sides of the transport trough and that the two parts of the sieve plate are positioned at an angle to the funnel so that the solid components are transported against the force of gravity.

12. Apparatus according to claim 3, characterized in that the track takes the form of a mouable track.

13. Apparatus for removing solid components from a fluid, including a first trough in which said fluid is adapted to flow, a transport means in the form of a transport trough having an axial direction and a circumference and which is inclined to the first trough at an angle of less than 90° and having a rotatably driven transport worm or transport helix, the transport means having at one end a solid material outlet and at the opposite end a sieving surface located across at least a portion of the transport means circumference, the sieving surface being adapted to sieve the solid components out of the fluid and discharge them to the solid material outlet via the transport worm or the transport helix in the axial direction of the transport means, characterized in that there being an additional sieving apparatus located between the solid material outlet and the sieving surface at the head of the transport means in the direction of transportation, said additional sieving apparatus having a sieving surface having a projection onto the transport means which is larger than the diameter of the transport trough, the additional sieving apparatus being located at a predetermined height above the bottom of the first trough and adapted to discharge sieved-out solid components from above said height into the transport means and in that the first trough is correspondingly widened in a region proximate the additional sieving apparatus, wherein the additional sieving apparatus has a discharge device which transports the solid components sieved out of the additional sieving apparatus into a funnel from above said predetermined height, which connects the additional sieving apparatus with the transport means, and wherein the sieving apparatus is formed as a rotationally driven drum sieve, in whose central axis the transport trough is located, and there are located inside the drum sieve at least two diametrically opposed entraining members.

14. Apparatus according to claim 13, characterized in that a nozzle arrangement is located above the drum sieve parallel to the axial direction of the drum sieve.

15. Apparatus according to claim 14, characterized in that the nozzle arrangement is located in the first trough opposite the funnel.

16. Process for removing solid components from a fluid flowing in a first trough, in which the fluid is guided into a sieving helix which consists of a transport helix or transport worm rotatably driven within a transport pipe or transport trough, at least portions of which are formed as a sieving surface, the solid components being sieved from the fluid through the sieving surface and then carried away by the transport helix or transport worm in the axial direction of the transport pipe or transport trough to a solids discharge, characterized in that, the fluid is led in amounts above a predetermined flow quantity past an additional sieving apparatus, which is located between the solids discharge and the sieving surface at a predetermined height above the bottom of the first trough, the additional sieving apparatus having a larger sieving surface in comparison with the sieving surface of the transport pipe or the transport trough, the solid components sieved-out by the additional sieving apparatus being discharged into the transport pipe or the transport trough, and the additional sieving apparatus has discharge devices which are activated at said predetermined height in the first trough.

17. Process according to claim 16, characterized in that the sieving surface and the additional sieving apparatus are cleansed with brushes which are located at the transport helix or the transport worm and rotate with same.

18. Process according to claim 17, characterized in that the brushes each have a plurality of bristles which are mounted in a brush body of metal or plastic, the bristles being surrounded with a rubber mass which wears down during cleansing.

* * * * *